Jan. 20, 1925.
C. D. BUNNELL
1,523,396
BUILDING BLOCK
Filed Jan. 11, 1923
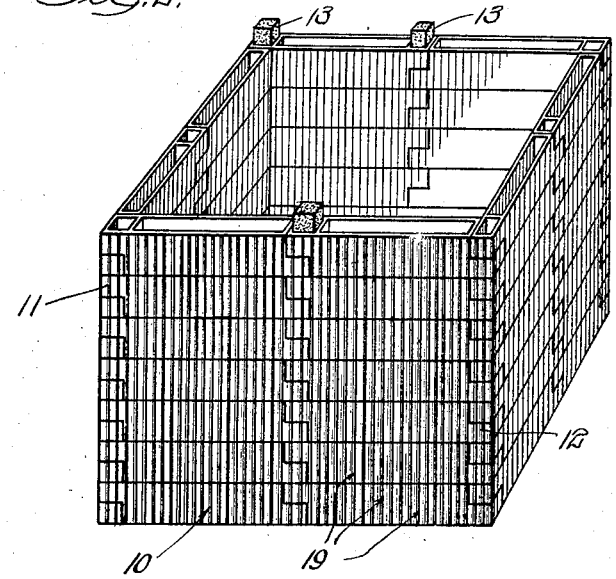
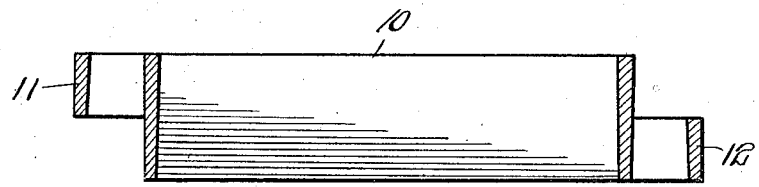
Inventor:
CHARLES D. BUNNELL
By Foree Rain & Hinkle
Attys.

Patented Jan. 20, 1925.

1,523,396

UNITED STATES PATENT OFFICE.

CHARLES D. BUNNELL, OF CHICAGO, ILLINOIS.

BUILDING BLOCK.

Application filed January 11, 1923. Serial No. 612,000.

*To all whom it may concern:*

Be it known that I, CHARLES D. BUNNELL, a citizen of the United States, residing at Chicago, in the county of Cook and State of Illinois, have invented certain new and useful Improvements in Building Blocks, of which the following is a specification.

The invention relates to building blocks.

One of the objects of the invention is to simplify and cheapen wall constructions.

Another object is to provide a block for constructing walls, which can be made by unskilled labor, by simply laying blocks without mortar, and subsequently tying the blocks together by pouring concrete conglomerate into vertically registering sockets and thus molding posts or studs within the wall at regular distances apart.

Blocks, tile or bricks to be laid in mortar require the services of skilled mechanics and are not available for use by the farmer or other unskilled workmen.

My improved structure may be made of burnt clay, as a tile, or it may be molded of cement mortar or aggregate into cement blocks and used with equal facility and advantage in the construction of houses of all kinds, including residences, garages, barns, silos, hog houses, chicken houses, fences, and walls for all purposes.

After the walls have been formed they may be plastered on one or both sides.

Each block encloses an air space. Hence houses constructed of my blocks will be relatively warm in cold weather and cool in warm weather.

A house built of my blocks is partly monolithic in character, which gives it great strength, at the same time the walls are collections of separated air cells.

Other objects and advantages will hereinafter appear.

In the drawings:—

Fig. 1 is a longitudinal section through the block.

Fig. 2 shows how the blocks may be arranged in angular positions with respect to each other.

In all the views the same reference characters indicate similar parts.

A block 10, shown in Fig. 1, extends from socket 11, at one end to the socket 12 at the other end. These sockets are to contain posts 13 to be subsequently molded therein after the blocks have been laid, or after several courses have been laid. The posts, or studs 13 are made by pouring cement mortar into the registering sockets, which, after the cement sets become superlatively strong.

After a wall or roof has been laid it may be plastered, as at 18.

The outer surfaces of the block may be corrugated, as at 19, to form a more complete mechanical bond with the plaster to be applied thereto.

The blocks may be made in suitable lengths, or in any lengths, to suit the exigencies of the structure and in any desired widths, and the sockets may be made smaller or larger by proportioning the thickness of the surrounding walls to correspond with the size of studs desired and the studs may be reenforced when desired, as in roofs, by placing metal rods or pipes in the sockets before the concrete is poured therein.

The blocks may be used for foundations of buildings in which case it is well to fill the entire block underground with cement mortar.

The blocks may also be curved so that they may be used for making silos, and when tiles are used instead of cement blocks and sockets may nevertheless be filled with cement to provide cement or concrete studs or rafters.

While I have herein shown a single embodiment for the purpose of clear disclosure, it will be manifest to persons skilled in the art that many changes may be made in the general arrangement and disposition of the parts within the scope of the appended claim.

Having described my invention what I claim as new and desire to secure by Letters Patent, is:—

A hollow building block having a vertically open socket at each end, each said socket equal to one-half of the height of the block and one located on each side of a central horizontal plane at the respective ends of the block, said block having one single opening between the sockets presenting an unobstructed side wall on each side within the block, the walls about the sockets and intermediate opening being substantially uniform in thickness.

In testimony whereof I hereunto subscribe my name.

CHARLES D. BUNNELL.